(12) United States Patent
Anderson

(10) Patent No.: US 7,811,043 B2
(45) Date of Patent: Oct. 12, 2010

(54) BELT LOADER EXTENSION RAMP

(76) Inventor: Ryan Gale Anderson, 3353 30th Ave. South, Fargo, ND (US) 58103

( * ) Notice: Subject to any disclaimer, the term of this patent is extended or adjusted under 35 U.S.C. 154(b) by 162 days.

(21) Appl. No.: 12/056,152

(22) Filed: Mar. 26, 2008

(65) Prior Publication Data
US 2008/0236993 A1 Oct. 2, 2008

Related U.S. Application Data

(60) Provisional application No. 60/920,467, filed on Mar. 27, 2007.

(51) Int. Cl.
B65G 13/00 (2006.01)
(52) U.S. Cl. .................. 414/398; 414/401; 198/588; 198/594
(58) Field of Classification Search .......... 414/397, 414/398, 401, 402; 198/311, 529, 588, 592, 198/594, 605; 193/2 A, 4
See application file for complete search history.

(56) References Cited

U.S. PATENT DOCUMENTS

| | | | |
|---|---|---|---|
| 2,634,870 A | | 3/1953 | Barnum |
| 2,888,130 A | * | 5/1959 | Mousel ................. 198/632 |
| 3,044,641 A | | 7/1962 | Code |
| 3,126,112 A | | 3/1964 | Shaw et al. |
| 3,524,558 A | | 8/1970 | Mastracci et al. |
| 3,687,321 A | | 8/1972 | Goodhart et al. |
| 3,836,021 A | * | 9/1974 | McWilliams ............. 414/398 |
| 3,944,096 A | | 3/1976 | Carder |
| 4,281,955 A | * | 8/1981 | McWilliams ............. 414/398 |
| 4,304,518 A | * | 12/1981 | Carder et al. ............ 414/495 |
| 4,425,069 A | * | 1/1984 | Saur et al. .............. 414/398 |
| 4,470,742 A | * | 9/1984 | Schindler .............. 414/286 |
| 4,679,381 A | | 7/1987 | Truninger |
| 4,690,606 A | | 9/1987 | Ross |
| 4,780,041 A | * | 10/1988 | Ashby, Jr. .............. 414/398 |
| 5,094,337 A | | 3/1992 | van Veldhuisen et al. |
| 5,143,194 A | * | 9/1992 | Sang .................... 198/301 |
| 5,325,953 A | | 7/1994 | Doster et al. |
| 5,685,416 A | * | 11/1997 | Bonnet ................. 198/812 |
| 5,697,753 A | * | 12/1997 | Aurora et al. ........... 414/398 |
| 5,902,089 A | * | 5/1999 | Sinn et al. ............. 414/398 |
| 6,471,461 B2 | * | 10/2002 | Muilwyk ............... 414/276 |
| 6,491,154 B2 | * | 12/2002 | Ydoate et al. .......... 198/461.3 |
| 6,533,096 B2 | * | 3/2003 | Gilmore et al. ......... 193/35 TE |
| 6,564,751 B2 | * | 5/2003 | Anderson et al. ....... 119/845 |
| 6,702,542 B1 | | 3/2004 | Chance et al. |
| 6,823,985 B2 | * | 11/2004 | Gilmore et al. ......... 198/588 |

(Continued)

Primary Examiner—Douglas A Hess
(74) Attorney, Agent, or Firm—Merchant & Gould P.C.

(57) ABSTRACT

A belt loader assembly includes a belt loader and an extension assembly. The belt loader includes a conveyor belt and a frame. The extension assembly includes an extension portion, a connection portion, and a bumper portion. The extension portion includes a plate having a first end portion and a second end portion. The connection portion is engaged with the first end portion of the plate and with the frame of the belt loader. The bumper portion is engaged with the second end portion of the plate. An extension assembly includes a plate having a first end portion and an oppositely disposed second end portion. The extension assembly further includes a bumper portion engaged to the plate at the second portion. The bumper portion includes a bumper. A connection portion is engaged with the first end portion and adapted for engagement with a belt loader.

18 Claims, 18 Drawing Sheets

U.S. PATENT DOCUMENTS

| | | | |
|---|---|---|---|
| 6,854,147 B1 * | 2/2005 | Ahlsten | 14/69.5 |
| 7,404,556 B2 * | 7/2008 | Allen et al. | 271/201 |
| 7,470,099 B2 * | 12/2008 | Bengtsson | 414/346 |

* cited by examiner

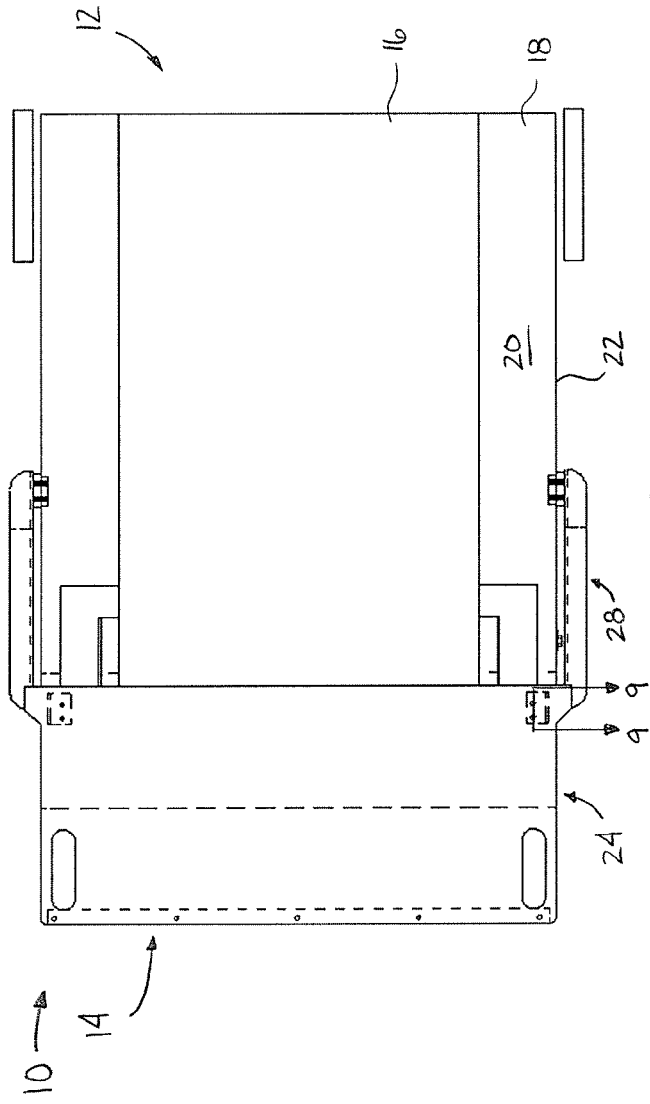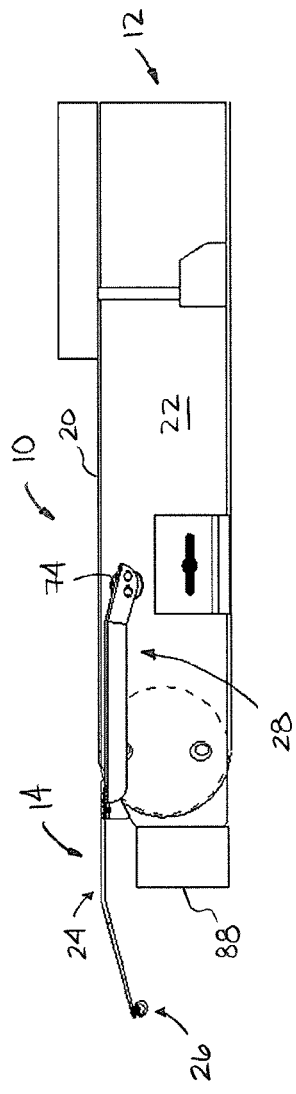

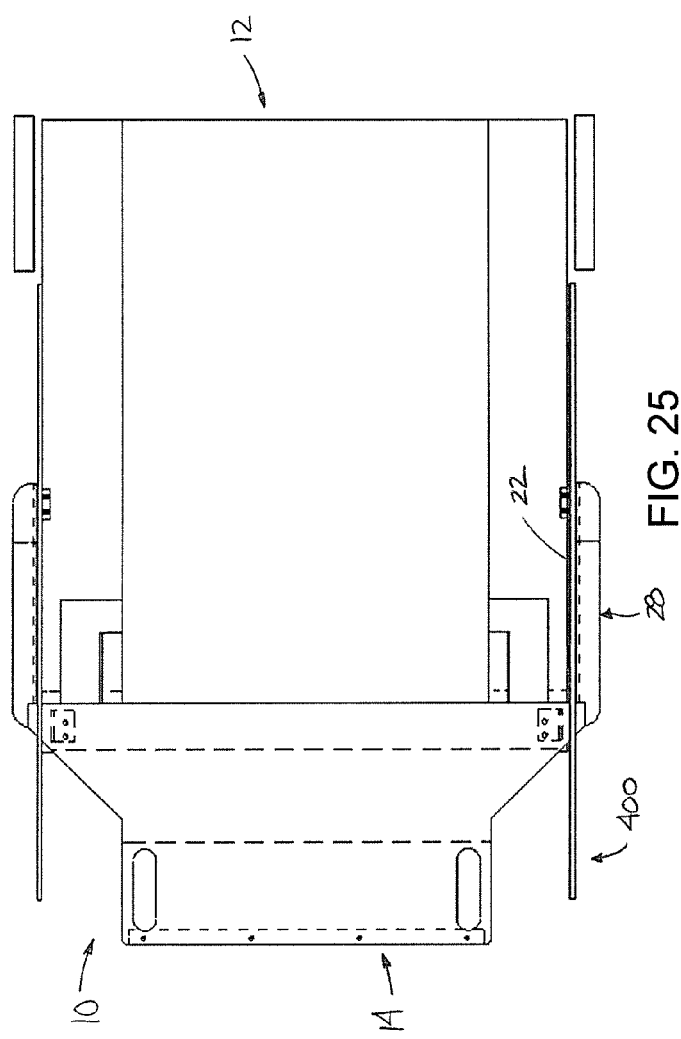
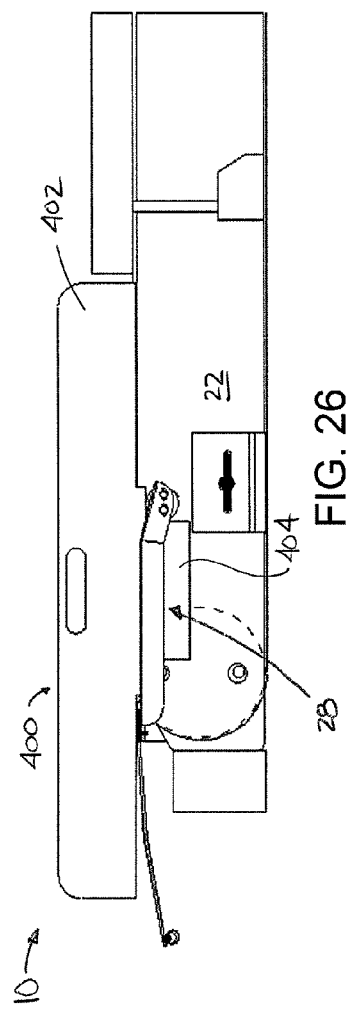
FIG. 25
FIG. 26

BELT LOADER EXTENSION RAMP

CROSS-REFERENCE TO RELATED APPLICATION

This application claims the benefit of U.S. Provisional Patent Application Ser. No. 60/920,467, filed Mar. 27, 2007, which application is hereby incorporated by reference in its entirety.

TECHNICAL FIELD

The present disclosure relates generally to belt loaders for cargo carriers, and more particularly, to belt loaders for airplanes.

BACKGROUND

The rapid transportation of cargo has become a necessity in today's society. More and more packages are being sent throughout the country via overnight couriers. One typical way in which the couriers can get packages to faraway destinations in such a short period of time is by aircraft. While airplanes have been used for quite some time to transport cargo, there are some disadvantages associated with loading cargo onto airplanes.

Typically, belt loaders are used to get cargo from the ground level up to the cargo door of an airplane. These belt loaders consist primarily of a conveyor belt that is angled toward the cargo door of the airplane. However, due to repeated damage to airplanes during the loading of cargo resulting from airplanes hitting the belt loaders in response to wind, many couriers require belt loaders to be positioned between 1 to 4 inches from the cargo door. As a result of this requirement, workers loading cargo must reach outside of the cargo door of the airplane to remove cargo from the conveyor belt of the belt loader. In addition to reaching outside of the airplane door, workers must also reach down to pick up the cargo since the cargo is typically positioned slightly lower than the floor level of the airplane. These strenuous repeated movements of reaching out and down for cargo often result in back injuries, particularly in the lower back. In addition to lower back injuries, the position of the belt loader can also result in damage to cargo. As the belt loader is positioned around 4 inches from the cargo door, there are occasions when cargo will come off the conveyor belt and fall to the ground before it can be grabbed by the cargo loader. Moreover, in an effort to position the belt loader closer to the airplane, the belt loader may accidentally hit the airplane, causing damage to both the belt loader and the airplane.

SUMMARY

One aspect of the present disclosure relates to a belt loader assembly having a belt loader and an extension assembly. The belt loader includes a conveyor belt and a frame. The extension assembly includes an extension portion, a connection portion, and a bumper portion. The extension portion includes a plate having a first end portion and a second end portion. The connection portion is engaged with the first end portion of the plate and with the frame of the belt loader. The bumper portion is engaged with the second end portion of the plate.

Another aspect of the present disclosure relates to an extension assembly for a belt loader. The extension assembly includes a plate having a first end portion and an oppositely disposed second end portion. The extension assembly further includes a bumper portion engaged to the plate at the second end portion. The bumper portion includes a bumper. A connection portion is engaged with the first end portion and adapted for engagement with a belt loader.

A further aspect of the present disclosure relates to a method for operating an extension assembly of a belt loader assembly. The method includes pivoting an extension assembly of a belt loader assembly about an axis of a pin member that is connectedly engaged with a belt loader. The extension assembly is pivoted such that the extension assembly is in a transport position. A front end of the belt loader is positioned adjacent to a cargo door of a transport vehicle. The extension assembly is pivoted about the axis of the pin member such that an end portion of a plate of the extension assembly is disposed through the cargo door of the transport vehicle.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a top view of a belt loader assembly having features that are examples of aspects in accordance with the principles of the present disclosure.

FIG. 2 is a side view of the belt loader assembly of FIG. 1.

FIG. 25 is a top view of the belt loader assembly of FIG. 1 with the guard of FIG. 24 installed FIG. 26 is a side view of the belt loader assembly of FIG. 1 with the guard of FIG. 24 installed.

DETAILED DESCRIPTION

Figure 3:
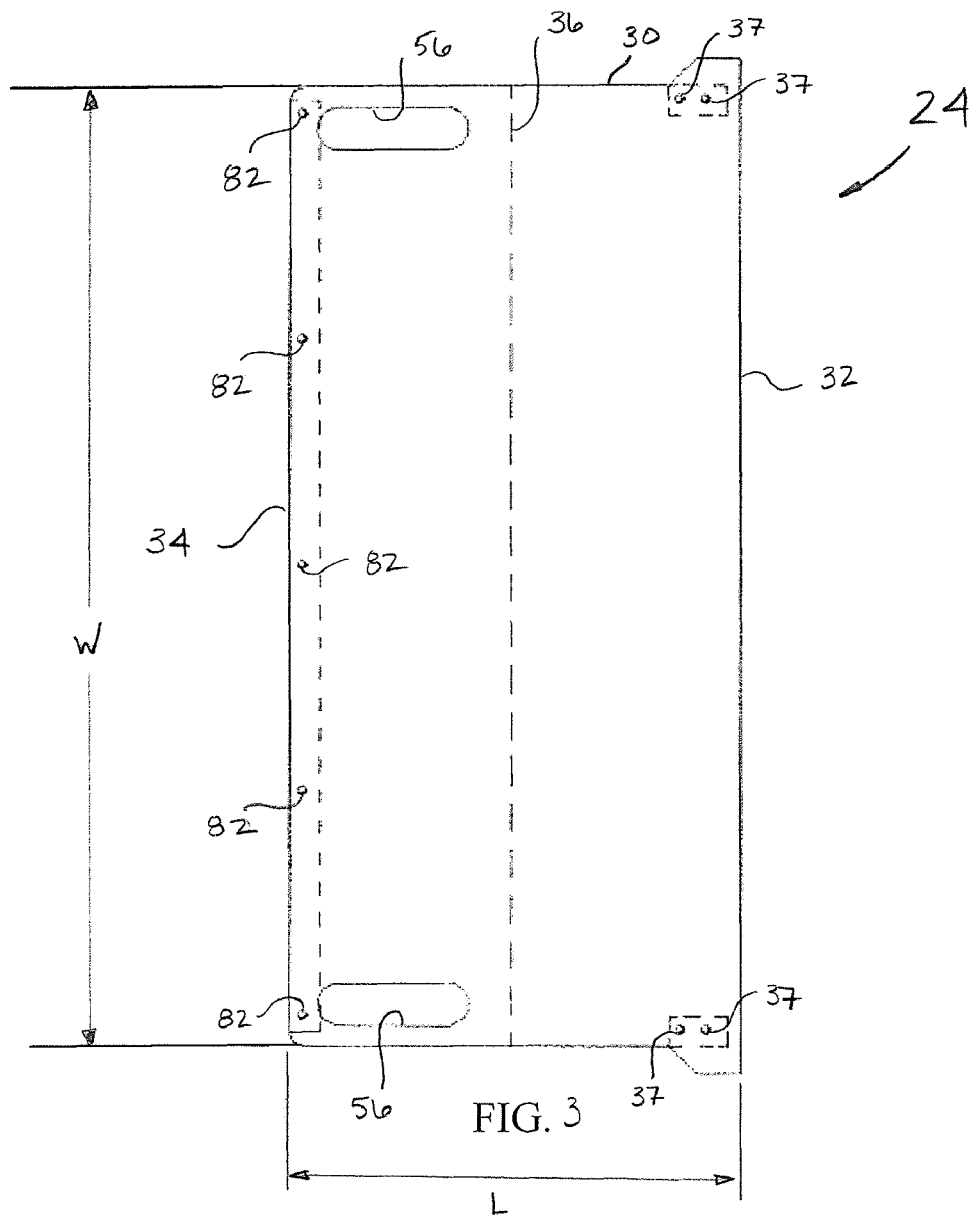
FIG. 3 is a top view of a plate suitable for use with the belt loader assembly of FIG. 1.

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1 and 2, a belt loader assembly, generally designated 10, is shown. Although the belt loader assembly 10 will be described in the present disclosure with regard to loading and unloading cargo from an airplane, it will be understood that the scope of the present disclosure is not limited to airplanes as the belt loader assembly 10 could be used with many different types of transporting vehicles. In addition, it will be understood that the term cargo as used herein could include luggage, packages, etc.

The belt loader assembly 10 includes a belt loader, generally designated 12, and an extension assembly, generally designated 14. Belt loaders 12, such as that shown in FIG. 1, are well known in the art and are frequently used to convey cargo onto vehicles such as airplanes. Typical belt loaders 12 include a conveyor belt 16 and a frame 18. The conveyor belt 16 is usually driven by a hydraulic or electric motor around a plurality of rollers, which are disposed on opposite ends of the frame 18. The frame 18 includes a top surface 20, over which the conveyor belt 16 is driven, and two oppositely disposed sidewalls 22.

The extension assembly 14 includes an extension portion, generally designated 24, a bumper portion, generally designated 26 (shown in FIG. 2), and a connection portion, generally designated 28.

Figure 4:
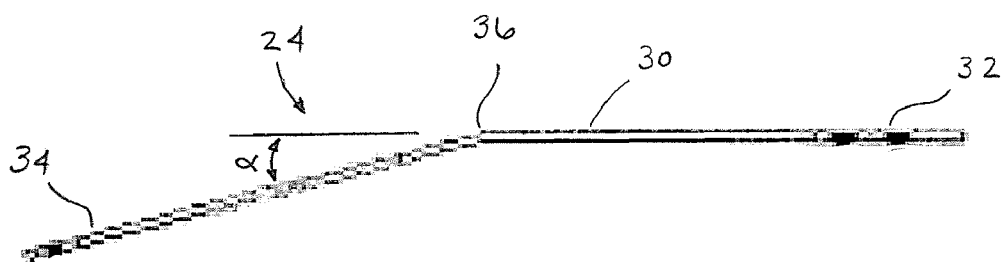
FIG. 4 is a side view of the plate of FIG. 3.
Figure 5:
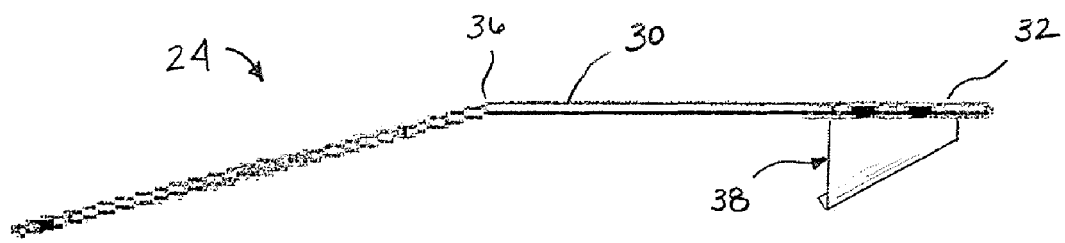
FIG. 5 is a side view of the plate of FIG. 3 and a spacer suitable for use with the belt loader assembly of FIG. 1.
Figure 6:
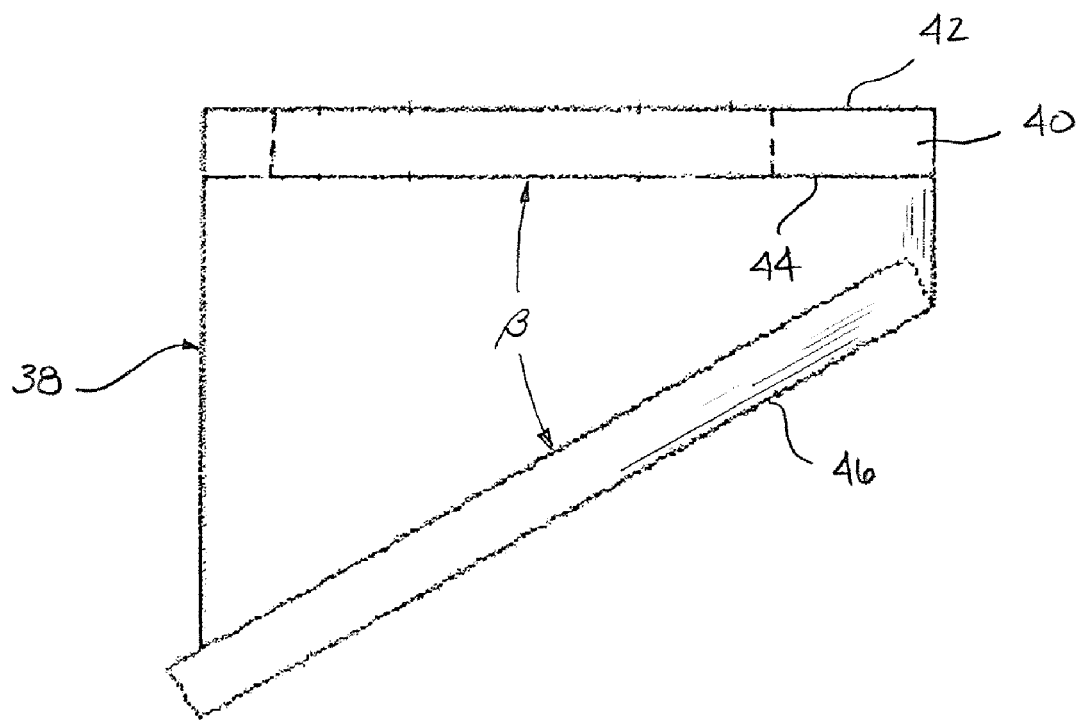
FIG. 6 is a side view of the spacer of FIG. 5.
Figure 7:
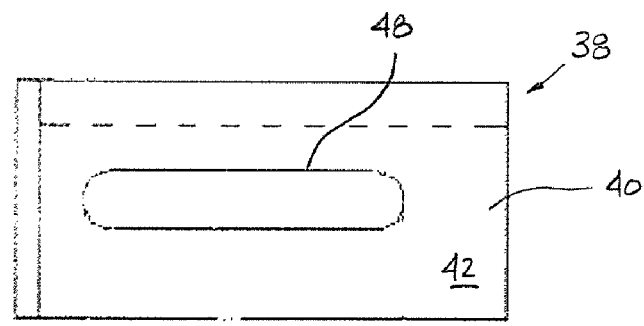
FIG. 7 is top view of the spacer of FIG. 5
Figure 8:
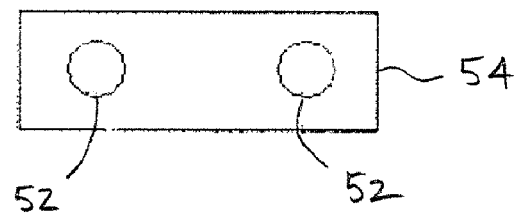
FIG. 8 is a top view of a mounting bracket suitable for use with the belt loader assembly of FIG. 1.
Figure 9:
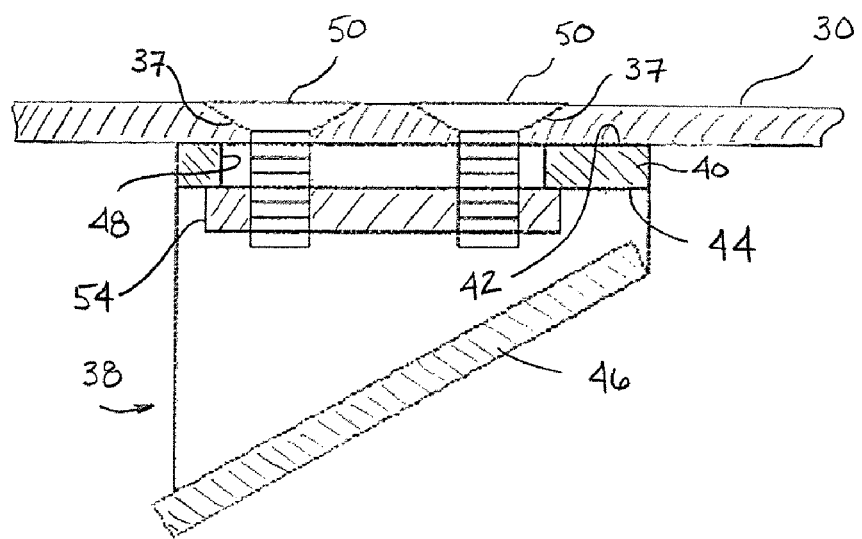
FIG. 9 is a cross-sectional view of a spacer assembly suitable for use with the belt loader assembly of FIG. 1 taken on line 9-9 of FIG. 1.
Figure 10:
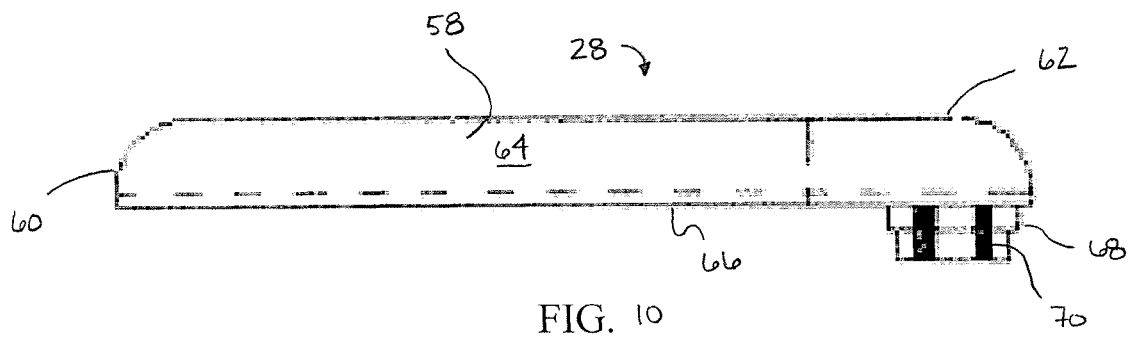
FIG. 10 is a top view of a connection portion of the belt loader assembly of FIG. 1.
Figure 11:
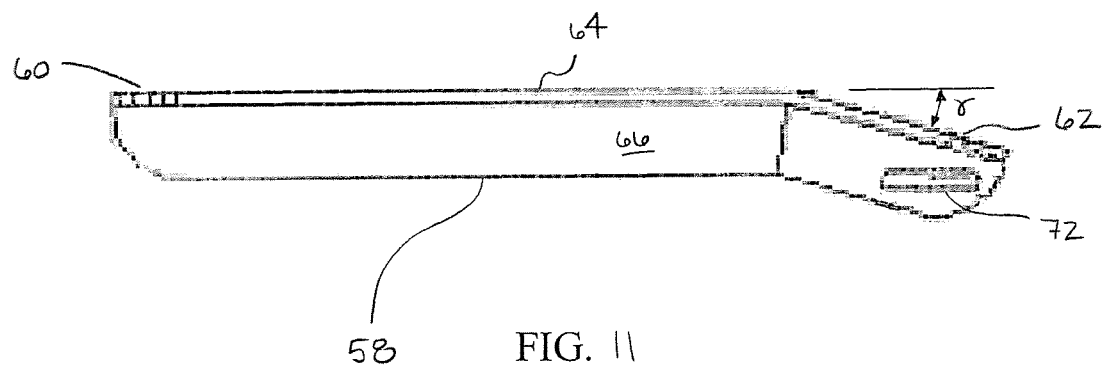
FIG. 11 is a side view of an arm of the connection portion of FIG. 10.
Figure 12:
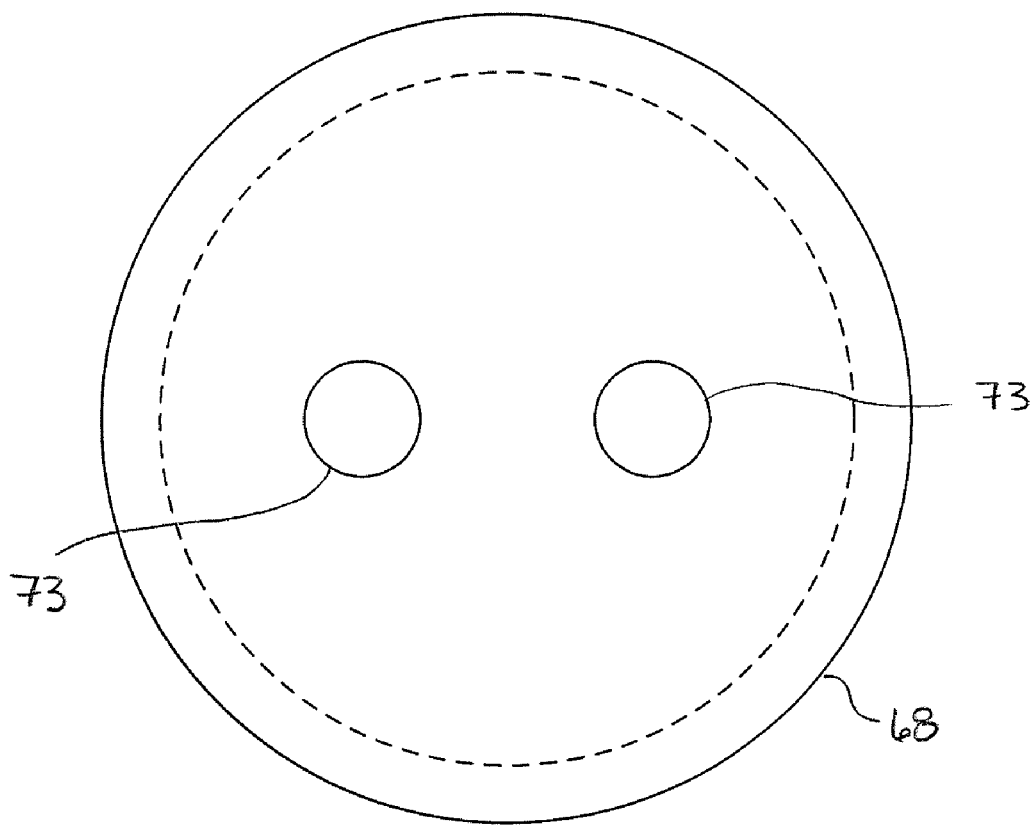
FIG. 12 is a side view of a pin member suitable for use with the belt loader assembly of FIG. 1.
Figure 13:
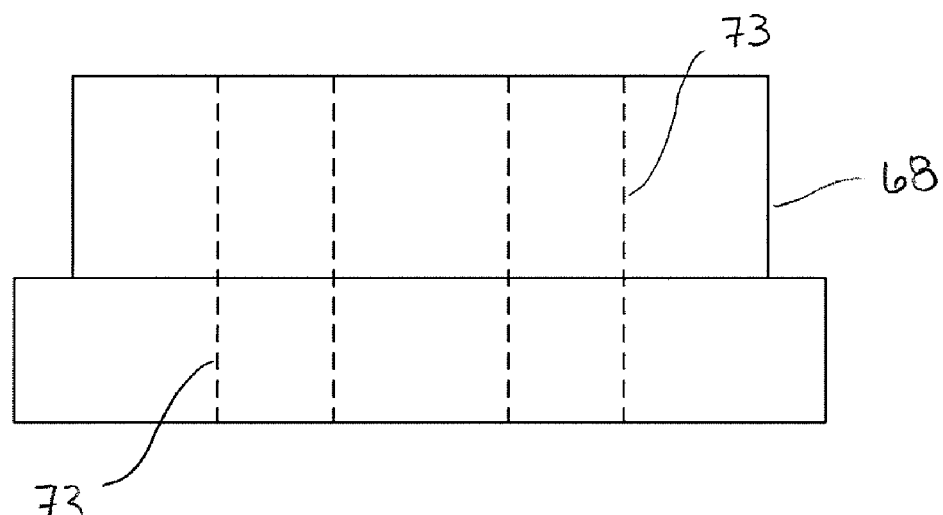
FIG. 13 is a top view of the pin member of FIG. 12.
Figure 14:
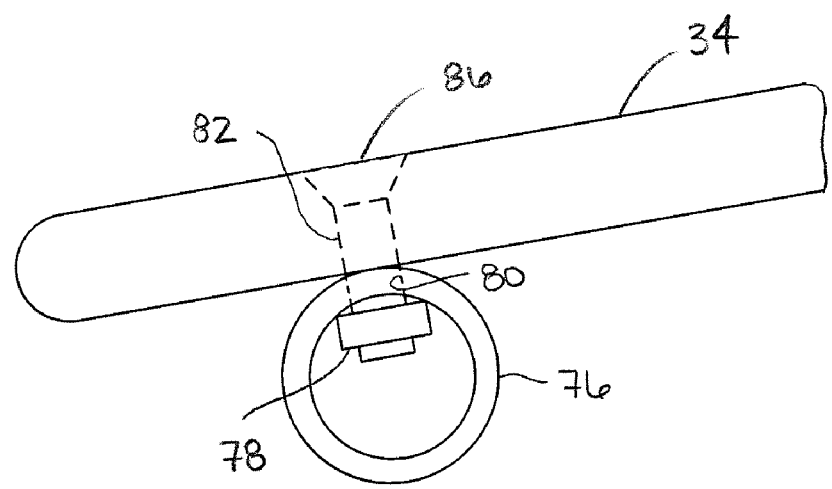
FIG. 14 is a side view of a bumper portion suitable for use with the belt loader assembly of FIG. 1.
Figure 15:
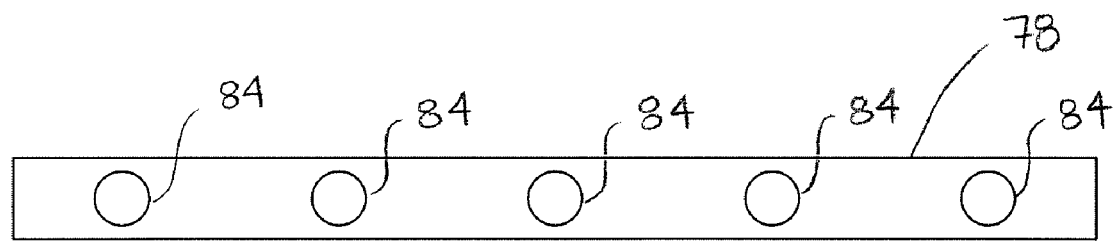
FIG. 15 is a top view of a bracket suitable for use with the belt loader assembly of FIG. 1.

Referring now to FIGS. 3 and 4, the extension portion 24 of the subject embodiment will now be described. The extension portion 24 includes a plate 30 having a first end portion 32 and a second end portion 34. The plate 30 defines a bend 36 (shown as a dashed line in FIG. 3) disposed between the first end portion 32 and the second end portion 34. As best shown in FIG. 4, the bend 36 provides an angle α between the first end portion 32 and the second end portion 34 of the plate 30. In a preferred embodiment, the bend 36 is disposed midway along a length L of the plate 30. In a preferred embodiment, the length L is 16 inches. In the embodiment shown, the angle α is approximately 15 degrees. It can be appreciated, however, that the angle α may be smaller or larger for some applications and for different loaders and/or airplanes. The plate 30 can be manufactured from a rigid material such as steel, aluminum, or other common materials. While the plate 30 has been described as a single angled plate, it will be understood that the scope of the present disclosure is not limited to the extension portion having a single angled plate as multiple planar plates could also be used.

Referring now to FIGS. 3 and 5-9, the plate 30 further includes at least one mounting hole 37, which extends through the plate 30, disposed on each side of the first end portion 32. In the embodiment shown, two mounting holes 37 are provided on each side of the first end portion 32. The mounting holes 37 are used to mount a spacer, generally designated 38, to each side of the first end portion 32 of the plate 30. The spacer 38 includes a first side 40, having an upper surface 42 and a lower surface 44, and a second side 46, where the second side 46 is at an angle β to the first side 40. In a preferred embodiment, the angle β is 30 degrees. The first side 40 of the spacer 38 includes a mounting slot 48 that extends through the first side 40. With the upper surface 42 of the spacer 38 abutting the plate 30, fasteners 50 (e.g., screws, bolts, rivets, etc.) are inserted through the mounting holes 37 in the plate 30 and through the mounting slot 48 in the first side 40 of the spacer 38 in order to attach the spacer 38 to the plate 30. While a variety of different types of fasteners 50 could be used to attach the spacer 38 to the plate 30, flat head screws are used in the embodiment shown. After insertion of the fasteners 50 through the mounting holes 37 and the mounting slot 48, the fasteners 50 are then threaded into threaded holes 52 in a bracket 54 that abuts the lower surface 44 of the first side 40 of the spacer 38.

In an alternative embodiment, however, the first side 40 of the spacer 38 could include a plurality of threaded holes rather than the mounting slot 48. In this embodiment, the fasteners 50 could be threadedly engaged with the threaded holes in the spacer 38. A shim could be used between the upper surface 42 of the first side 40 of the spacer 38 and the plate 30.

Referring again to FIG. 3, the second end portion 34 of the plate 30 defines at least one handle 56. In the embodiment shown, the handle 56 is an oblong opening through which the plate 30 can be grasped. In a preferred embodiment, there are two handles 56 in the second end portion 34 of the plate, with one handle 56 being on each side of the second end portion 34.

Referring now to FIGS. 10-13, the connection portion 28 of the extension assembly 14 will be described. The connection portion 28 includes at least one arm 58 having a first end region 60 and a second end region 62. The arm 58 of the connection portion 28 can be manufactured from some type of rigid material (e.g., steel, aluminum, etc.). In a preferred embodiment, the connection portion 28 of the extension assembly 14 includes two arms 58. In the embodiment shown, each arm 58 includes a top surface 64 and a side 66, with the side 66 being about perpendicular to the top surface 64. The first end region 60 of the arm 58 forms an angle γ with the second end region 62 of the arm 58. In the embodiment shown, the angle γ is approximately 15 degrees. It will be understood, however, that the scope of the present disclosure is not limited to the first end region 60 forming an angle γ with the second end region 62.

The first end region 60 of each arm 58 is in connected engagement with the first end portion 32 of the plate 30. The first end region 60 is fastened to the plate 30 by a plurality of fasteners (e.g., screws, bolts, rivets, etc.), a welded joint, or a combination thereof. The second end region 62 of each arm 58 is pivotally mounted to the frame 18 of the belt loader 12.

In the depicted embodiment, a pin member 68 is mounted to the second end region 62 of each arm 58 by a plurality of fasteners 70 (e.g., screws, bolts, rivets, etc.). While a variety of different types of fasteners 70 could be used to mount the pin member 68 to the second end region 62 of the arm 58, flat head screws are used in the embodiment shown. The plurality of fasteners 70, which extend through a slot 72 (shown in FIG. 11) in the side 66 of the second end region 62 of the arm 58, is in threaded engagement with threaded holes 73 in the pin member 68. The slot 72 allows for slight lateral adjustments in the position of the pin member 68 with respect to the arm 58.

The pin member 68 engages one of a plurality of pre-existing holes 74 (shown in FIG. 2) in the sidewall 22 of the frame 18 of the belt loader 12. The holes 74 in the sidewall 22 of the belt loader 12 are provided by belt loader manufacturers as maintenance holes for the adjustment of the conveyor belt 16 when the belt loader 12 is not in service. As such holes 74 are provided with most belt loaders 12, no modification of the frame 18 of the belt loader 12 is required to assemble the extension assembly 14 to the belt loader 12. In a preferred embodiment, the pin member 68 is a bushing. The bushing is used as the pin member 68 in a preferred embodiment in order to reduce wear associated with the pivotal engagement between the pin member 68 and the hole 74.

While the pin member 68 has been shown and described as being connected to the connection portion 28, it will be understood that the scope of the present disclosure is not limited to the pin member 68 being mounted to the connection portion 28 as the pin member 68 could alternatively be mounted to the sidewall 22 of the frame 18 of the belt loader 12. However, this would require modification of the frame 18 of the belt loader 12.

Referring now to FIGS. 2, 3, 14 and 15, the bumper portion 26 of the extension assembly 14 will now be described. The bumper portion 26 of the extension assembly 14 is mounted to the second end portion 34 of the plate 30. The bumper portion 26 includes a bumper 76 and a mounting bracket 78.

In a preferred embodiment, the bumper 76 is made from a flexible material such as rubber. In the embodiment shown, the bumper 76 is made from a piece of ¾-inch diameter radiator hose as measured at the inner diameter of the radiator hose. It can be appreciated, however, that other shock absorbing or impact absorbing devices or materials may be used as the bumper 76. The bumper 76 includes a plurality of mounting openings 80 disposed along the axial length of the bumper 76. The mounting openings 80 in the bumper 76 correspond to a plurality of thru-holes 82 in the second end portion 34 of the plate 30.

The mounting bracket 78 includes a plurality of threaded mounting holes 84 that correspond to the mounting openings 80 in the bumper 76 and the thru-holes 82 in the second end portion 34 of the plate 30. To attach the bumper 76 to the second end portion 34 of the plate 30, the mounting bracket 78 is inserted into the bumper 76 such that the threaded mounting holes 84 are aligned with the mounting openings 80 in the bumper 76. A plurality of fasteners 86 (e.g., screws, bolts, rivets, etc.) are inserted through the thru-holes 82 in the plate 30 and through the mounting openings 80 in the bumper 76. While a variety of different types of fasteners 86 could be used to mount the bumper 76 to the second end portion 34 of the plate 30, flat head screws are used in the embodiment shown. After insertion of the fasteners 86 through the thru-holes 82 and the mounting openings 80, the fasteners 86 are then threaded into the threaded mounting holes 84 in mounting bracket 78, which is disposed inside the bumper 76.

As discussed above, cargo carriers typically require that belt loaders 12 be positioned such that a front end 88 (shown in FIGS. 2 and 16) of the belt loader 12 is around 4 inches from the cargo door of the airplane in a horizontal direction. This requirement is an attempt by the cargo carriers to minimize potential damage to the airplane caused by the airplane hitting the belt loader 12 due to wind. With the front end 88 of the belt loader 12 positioned around 4 inches away from the cargo door of the airplane, the conveyor belt 16 is around 8 inches from the cargo door as the front end usually extends beyond the conveyor belt by about 4 inches. This position of the belt loader, however, requires cargo loaders to reach out of the cargo door to grab the cargo from the conveyor belt 16 in order to load that cargo into the airplane. This strenuous and repetitive movement by the cargo loaders typically results in injury such as low back pain. However, as will now be described, the teachings of the present disclosure reduce or eliminate these injuries while not increasing the risk of damage to the airplane.

Figure 16:
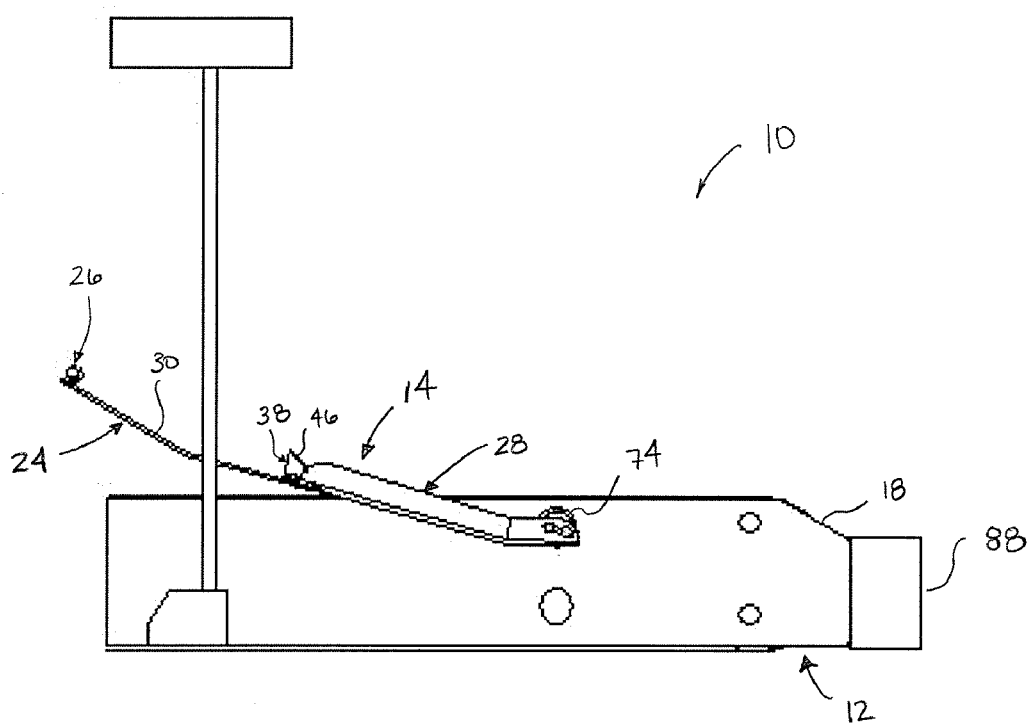
FIG. 16 is a side view of a belt loader assembly with the extension assembly in a transport position.
Figure 17:
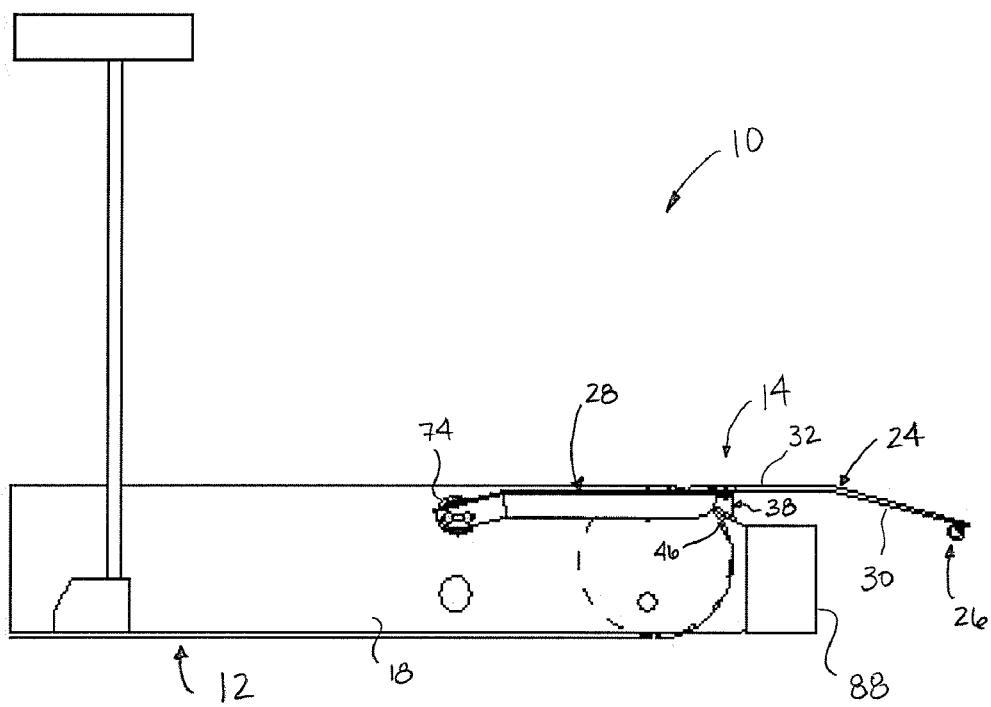
FIG. 17 is a side view of a belt loader assembly with the extension assembly in a loading position.

Referring now to FIGS. 16 and 17, the installation and operation of the belt loader assembly 10 will now be described. The extension assembly 14 is first installed onto the belt loader 12 by inserting the pin member 68 of each arm 58 of the extension assembly 14 into one of the corresponding holes 74 in the frame 18 of the belt loader 12. With the pin members 68 in the corresponding holes 74 of the frame 18, the operators of the belt loader 12 grasp the handle 56 in the plate 30 of the extension assembly 14 and pivot the extension assembly 14 about the axis of the pin members 68 so as to be in a transport position as shown in FIG. 16. Alternatively, a handle can be disposed in one of the arms 58. This handle in the arm 58 can be used to pivot the extension assembly 14 about the axis of the pin members 68 such that the extension assembly 14 is in the transport position. In this transport position (FIG. 16), the operators of the belt loader 12 can then properly position the belt loader 12 with respect to a cargo door of an airplane. As previously stated, the belt loader 12 is typically positioned such that the front end 88 of the belt loader 12 is around 4 inches away from the cargo door of the airplane in a horizontal direction. With the front end 88 of the belt loader 12 positioned around 4 inches from the cargo door, the operators of the belt loader 12 grasp the handle 56 in the plate 30 of the extension assembly 14 and rotate the extension assembly 14 about the axis of the pin members 68 so that the extension assembly 14 is in the loading position (shown in FIG. 17).

With the extension assembly 14 in the loading position (FIG. 17), the first end portion 32 of the plate 30 of the extension assembly 14 is nearly coplanar with the conveyor belt 16 of the belt loader 12. In this loading position (FIG. 17), the second side 46 of the spacers 38, which are mounted to the first end portion 32 of the plate 30, rest on the frame 18 of the belt loader 12, thereby supporting the first end portion 32 of the plate 30.

A width W (shown in FIG. 3) of the plate 30 of the extension assembly 14 is designed to be smaller than the opening of the cargo door of the airplane so that the second end portion 34 of the plate 30 can be inserted through the open cargo door of the airplane during loading. In a preferred embodiment, the width W of the plate 30 is about 36 inches. With the extension assembly 14 in the loading position (FIG. 17) and the second end portion 34 of the plate 30 inserted through the open cargo door, the bumper portion 26 either rests on the floor of the airplane or is suspended above the floor of the airplane. In a preferred embodiment, to further aid in the unloading of cargo, the bumper portion 26 of the extension assembly 14 is inserted through the cargo door such that the bumper 76 is just beyond the sill of the cargo door. With the bumper 76 just beyond the sill of the cargo door, more space is available for cargo in the airplane.

With the extension assembly 14 in the loading position (FIG. 17), cargo can be loaded into the airplane. As operators place cargo on the conveyor belt 16 of the belt loader 12, the cargo is transported along the conveyor belt 16 to the first end portion 32 of the plate 30 of the extension assembly 14. As the cargo moves off the conveyor belt 16 onto the first end portion 32, the cargo typically has sufficient momentum to continue to move onto the second end portion of the extension 14. Lighter cargo, however, that does not have sufficient momentum to move from the first end portion 26 to the second end portion 34 is pushed onto the second end portion 34 of the plate 30 by other cargo transitioning from the conveyor belt 16 to the first end portion 26. As previously stated, the second end portion 34 forms the angle α with the first end portion 32. In the embodiment shown, angle α is about 15 degrees. While the angle α could be greater or less than 15 degrees, in a preferred embodiment, the angle α should be chosen such that when cargo is on the second end portion 34 of the plate 30 awaiting to be unloaded by an operator, the cargo will not slide down the second end portion 34.

Figure 18:
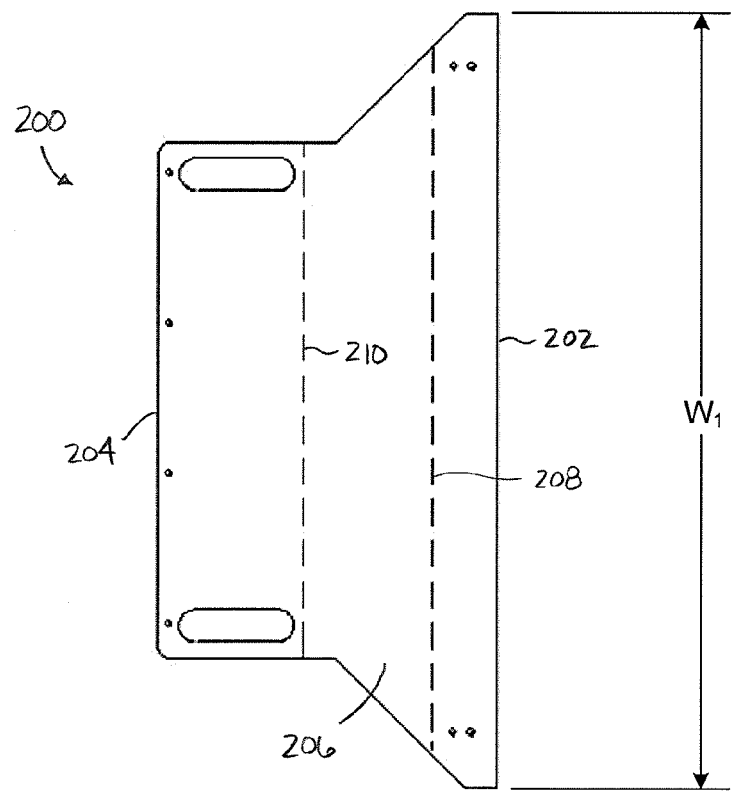
FIG. 18 is a top view of an alternate embodiment of an extension plate suitable for use in the belt loader assembly of FIG. 1.
Figure 19:
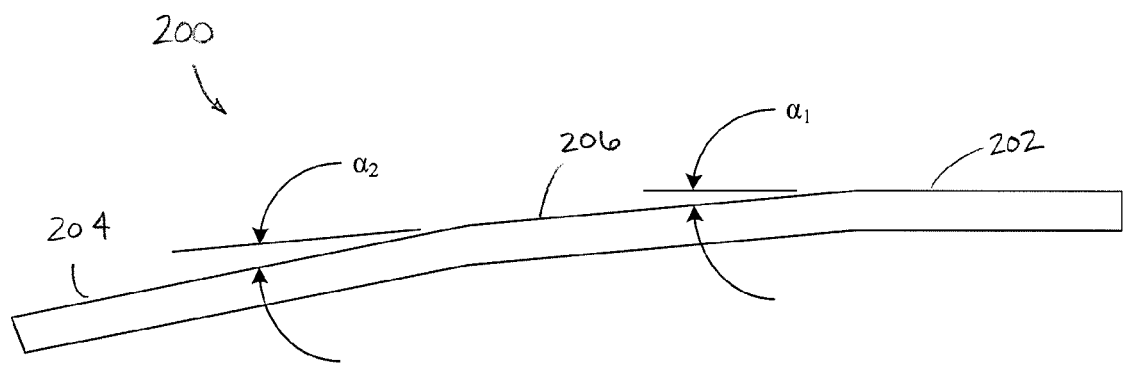
FIG. 19 is a side view of the extension plate of FIG. 18.
Figure 20:
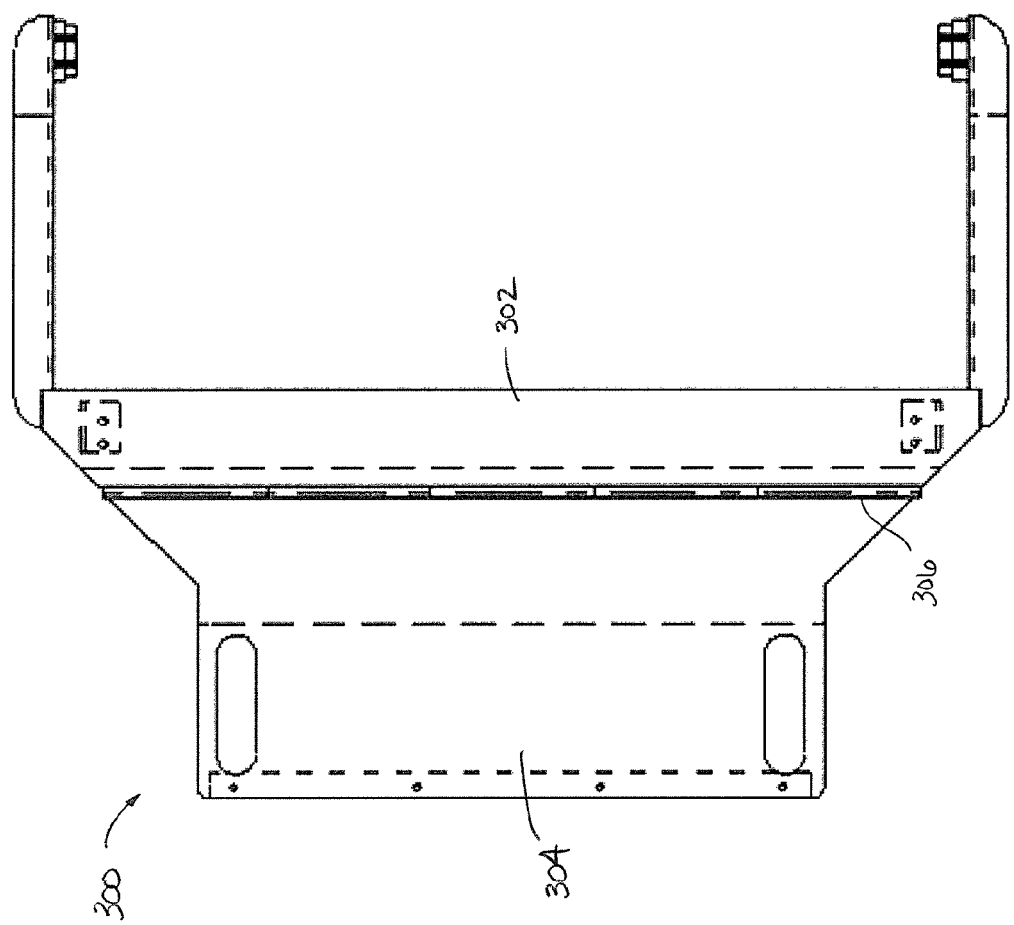
FIG. 20 is a top view of an alternate embodiment of an extension plate having a hinge member suitable for use in the belt loader assembly of FIG. 1.
Figure 21:
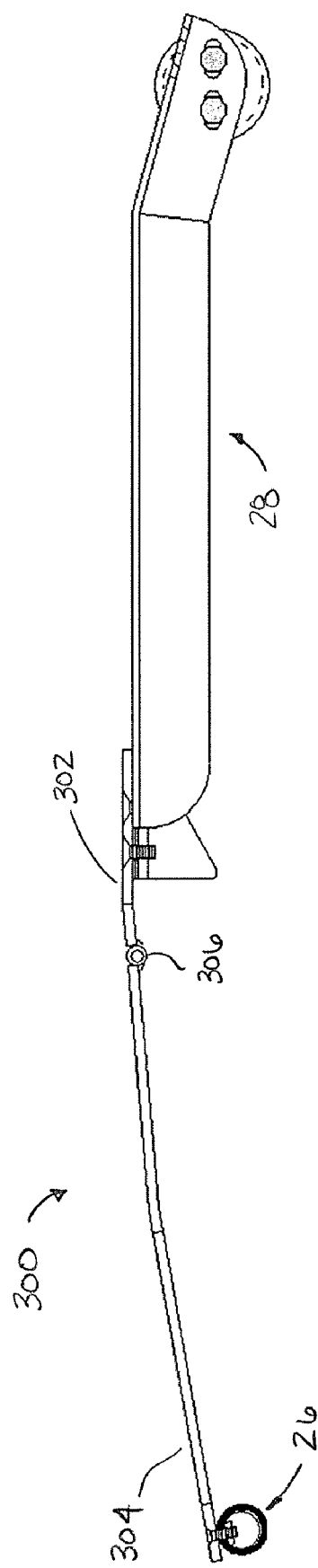
FIG. 21 is a side view of the extension plate of FIG. 20.

Referring now to FIGS. 18 and 19, an alternate embodiment of an extension plate 200 suitable for use with the extension portion 24 of the belt loader assembly 10 is shown. The extension plate 200 includes a first end portion 202, an oppositely disposed second end portion 204, and a mid-portion 206 disposed between the first and second end portion 202, 204.

The first end portion 202 includes a width $W_1$ while the second end portion 204 includes a width $W_2$. The width $W_2$ of the second end portion 204 is less than the width $W_1$ of the first end portion 202. In the subject embodiment, and by way of example only, the width $W_2$ of the second end portion 204 is about two thirds the width $W_1$ of the first end portion 202. In another embodiment, the width $W_2$ of the second end portion 204 is less than about three-quarters of the width $W_1$ of the first end portion 202.

The extension plate 200 includes a first bend 208 and a second bend 210 disposed between a first end portion 202 and the second end portion 204. As best shown in FIG. 19, the first bend 208 provides a first angle $\alpha_1$ between the first end portion 202 and the mid-portion 206 of the extension plate 200 while the second bend 210 provides a second angle $\alpha_2$ between the mid-portion 206 and the second end portion 204. In some applications of the belt loader assembly 10, the extension plate 200 having first and second angles $\alpha_1, \alpha_2$ may be preferred as it can provide for a more gradual entry of cargo through the cargo door from the belt loader 12.

In one embodiment, the first angle $\alpha_1$, as measured in accordance with FIG. 19, is greater than or equal to about 2 degrees. In another embodiment, the first angle $\alpha_1$ is in a range of about 2 degrees to about 10 degrees. In another embodiment, the first angle $\alpha_1$ is about 5 degrees. In one embodiment, the second angle $\alpha_2$, as measured in accordance with FIG. 19, is greater than or equal to about 2 degrees. In another embodiment, the second angle $\alpha_2$ is in a range of about 2 degrees to about 10 degrees. In another embodiment, the second angle $\alpha_2$ is about 5 degrees.

Referring now to FIGS. 20-23, an alternate embodiment of an extension plate 300 suitable for use with the extension portion 24 of the belt loader assembly 10 is shown. The extension plate 300 includes a first end portion 302 and an oppositely disposed second end portion 304.

In the subject embodiment, a hinge member 306 is disposed between the first end portion 302 and the second end portion 304 of the extension plate 300. The hinge member 306 allows the second end portion 304 of the extension plate 300 to be selectively repositionable relative to the first end portion 302.

Figure 22:
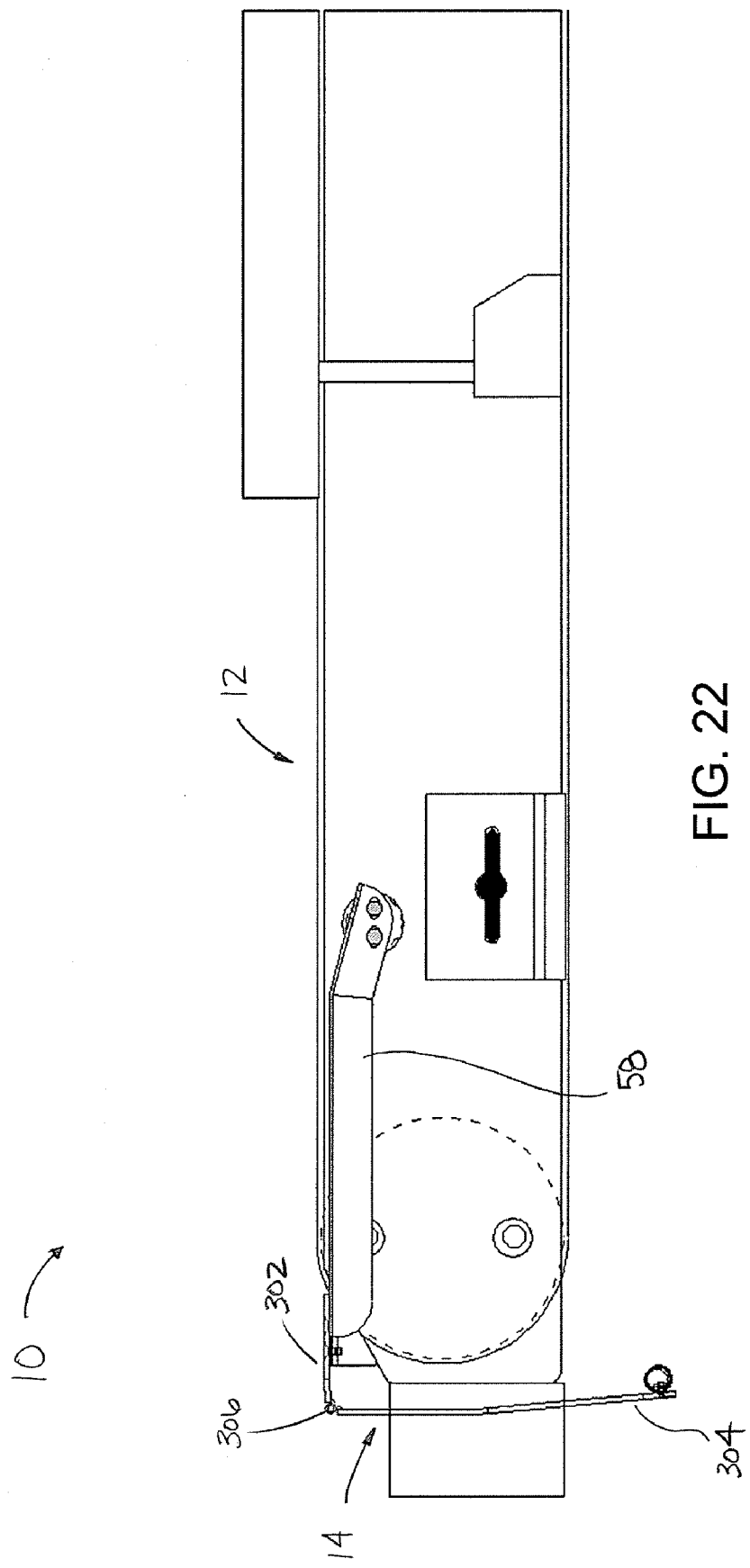
FIG. 22 is a side view of the belt loader assembly with the extension plate of FIG. 20.

In the depicted embodiment of FIG. 22, the second end portion 304 of the extension plate 300 is pivoted about the hinge member 306 in a downward direction relative to the first end portion 302. This configuration may be advantageous when moving the belt loader assembly 10 toward an aircraft as it may reduce the risk of inadvertently hitting the aircraft with the extension plate 300. This configuration may also be advantageous for use with smaller aircrafts in which the cargo door is positioned behind an engine. In this situation, the first end portion 302 of the extension plate 300 can be positioned such that it is generally aligned with the conveyor belt 16 while the second end portion 304 is pivoted about the hinge member 306 in a downward direction. The belt loader assembly 10 can then be positioned close to the cargo door of the aircraft. With the belt loader assembly 10 close to the cargo door, the second end portion 304 can be pivoted about the hinge member 306 in an upward direction and inserted into the cargo door. This configuration will allow the extension assembly 14 to be used with belt loaders 12 when an engine of the aircraft would otherwise interfere with the pivoting of the arms 58 from the transport position to the loading position.

Figure 23:
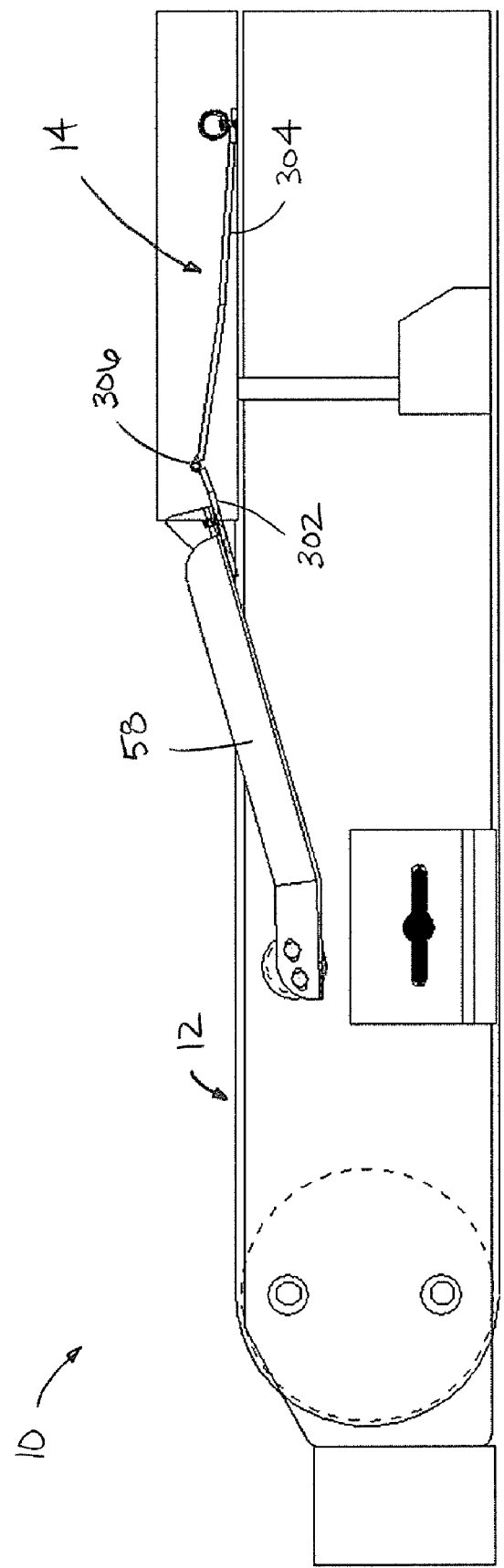
FIG. 23 is a side view of the belt loader assembly with the extension plate of FIG. 20 in the transport position.

In the depicted embodiment of FIG. 23, the extension plate 300 is shown in the transport position. In this position, the second end portion 304 is pivoted about the hinge member 306 such that the second end portion 304 is disposed adjacent to the conveyor belt 16. This configuration may be advantageous as it allows for compact storage of the extension plate 300 during transportation and positioning of the belt loader assembly 10.

Figure 24:
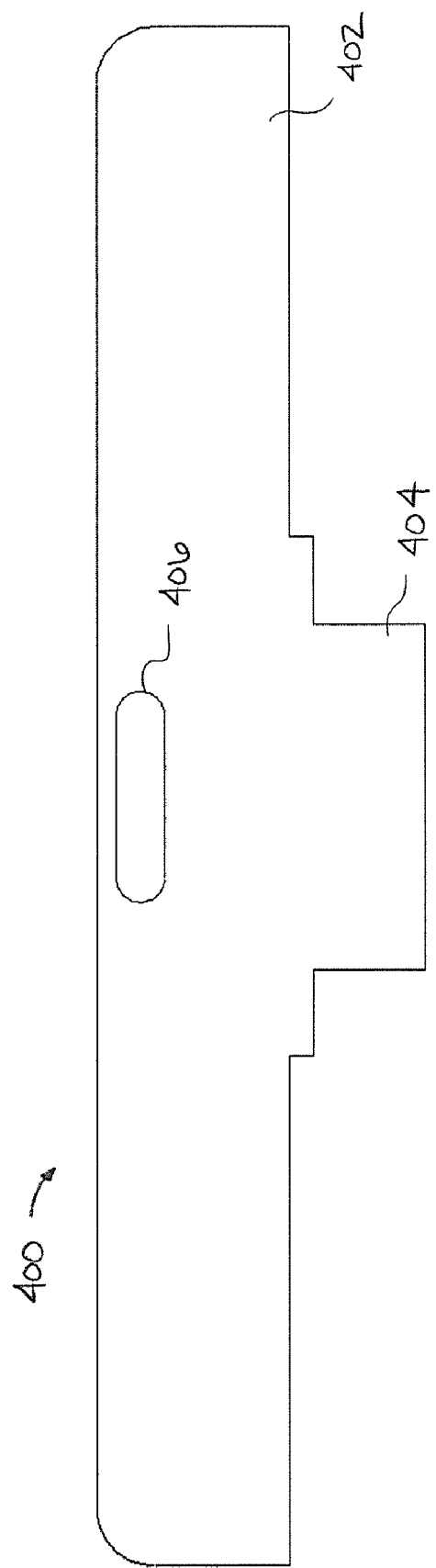
FIG. 24 is a side view of a guard suitable for use with the belt loader assembly of FIG. 1.
Figure 27:
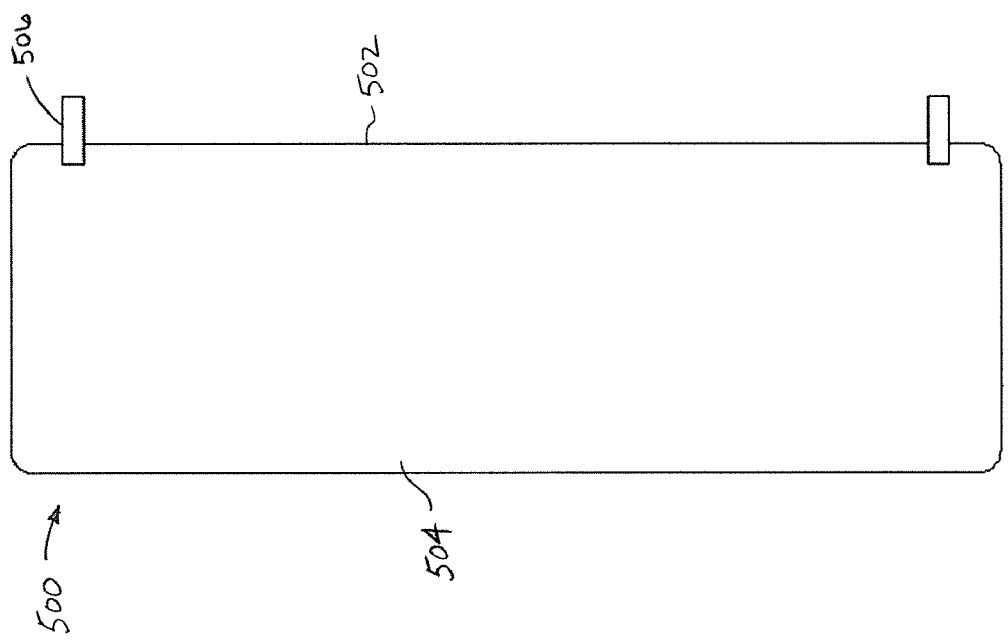
FIG. 27 is a top view of an extender suitable for use with the belt loader assembly of FIG. 1.

Referring now to FIGS. 24-26, a guard, generally designated 400, is shown. In the subject embodiment, the guard 400 is a high-density polyethylene material. It will be understood, however, that the scope of the present disclosure is not limited to the guard 400 being a high-density polyethylene material as other materials (e.g., sheet metal, aluminum, plastics, etc.) could be used.

The guard 400 includes a guard portion 402 and a mounting portion 404. In one embodiment, the guard portion 402 includes a handle 406 to assist in assembling and removing the guard 400 to/from the belt loader assembly 10. In the subject embodiment, the handle 406 is an elongated thru-hole. It will be understood, however, that the scope of the present disclosure is not limited to the guard portion 402 including a handle 406.

The mounting portion 404 is adapted for insertion between the connection portion 28 of the extension assembly 14 and the sidewall 22 of the belt loader 12. While the mounting portion 404 could alternatively be mounted to the frame 18 of the belt loader 12 by a plurality of fasteners, such a configuration may not be preferred as it would require modification to the frame of the belt loader 12.

With the mounting portion 404 disposed between the connection portion 28 and the sidewall 22 of the belt loader assembly 10, the guard portion 402 extends in a generally upward direction from the top surface 20 of the frame 18 of the belt loader 12. With the mounting portion 404 engaged with the belt loader assembly 10, the guard portion 402 extends laterally between a portion of the extension plate 200 and a portion of the belt loader 12. As gusts of wind have been know to push cargo from a belt loader during loading/unloading of cargo, this lateral extension of the guard portion 402 between the portion of the extension plate 200 and the portion of the belt loader 12 provides protection to the cargo being transported through the cargo door of the airplane from wind and thereby reduces the risk of cargo being pushed off of the belt loader 12.

Referring now to FIGS. 27-30, an extender 500 is shown. The extender 500 is adapted to provide an additional extension of the extension plate 200. The extender 500 includes a first end 502 and an oppositely disposed second end 504.

A plurality of mounts 506 is disposed on the first end 502 of the extender 500. In the subject embodiment, and by way of example only, there are two mounts 506 disposed on the first end 502 of the extender 500. Each of the plurality of mounts 506 includes a first portion 508 and a second portion 510. The first portion 508 is connectedly engaged to the first end 502 of the extender. In the subject embodiment, the first portion 508 is mechanically connected (e.g., weld, fasteners, adhesive, etc.) to the first end 502.

Figure 28:
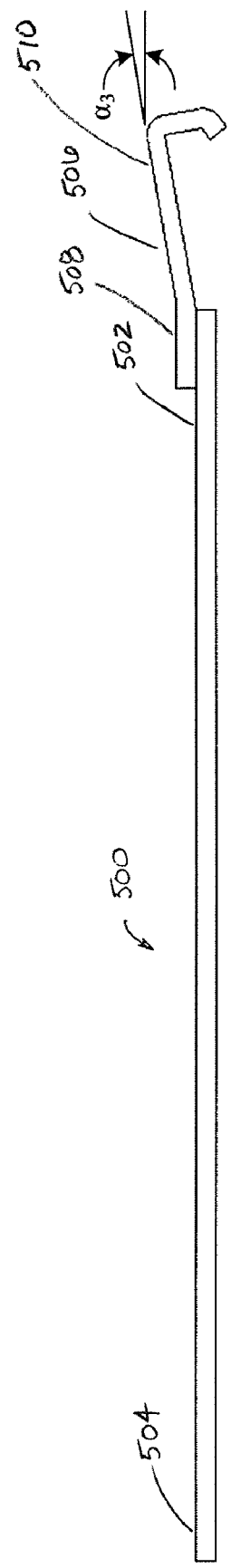
FIG. 28 is a side view of the extender of FIG. 27.
Figure 29:
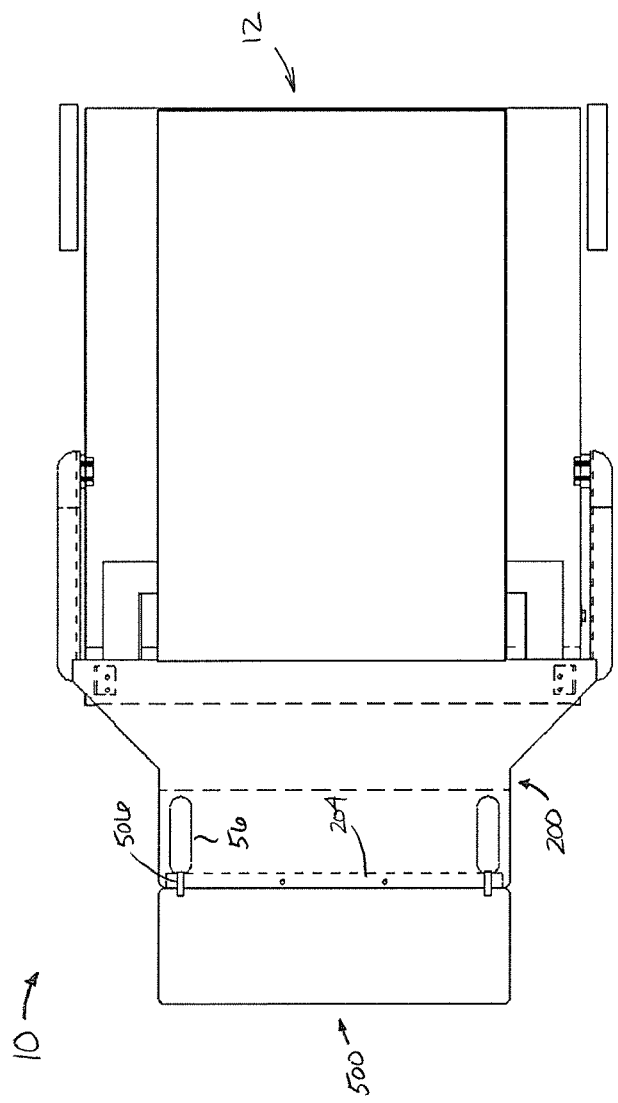
FIG. 29 is a top view of the belt loader assembly of FIG. 1 with the extender of FIG. 27 installed.
Figure 30:
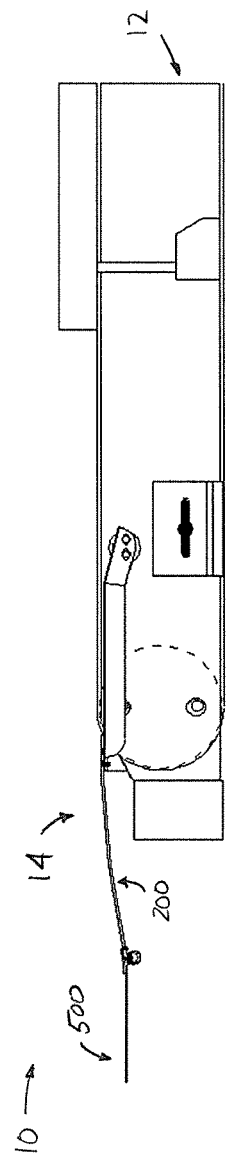
FIG. 30 is a side view of the belt loader assembly of FIG. 1 with the extender of FIG. 27 installed.

The second portion 510 of the mount 506 is adapted for engagement with a portion of the handle 56 in the second end portion 204 of the extension plate 200. In the subject embodiment, the second portion 510 of the mount 506 is generally hook shaped to reduce the risk of disengagement of the extender 500 from the extension plate 202. In one embodiment, the second portion 510 of the mount 506 is at an angle $\alpha_3$ relative to the first portion 508. In one embodiment, and by way of example only, the angle $\alpha_3$, as measured in accordance with FIG. 28, is in the range of about 4 degrees to about 20 degrees. In another embodiment, the angle $\alpha_3$ is generally equal to the sum of the first angle $\alpha_1$ and the second angle $\alpha_2$ of the first and second bends 208, 210, respectively.

While it will be understood that the scope of the disclosure is not limited to the second portion 510 of the mount 506 being at an angle relative to the first portion 508, the angle $\alpha_3$ may be advantageous. In certain situations, the conveyor belt 16 of the belt loader assembly 10 is oriented such that the rear end of the conveyor belt 16 is higher than the front end of the conveyor belt 16. In these situations, the angle of the extension plate 202 is added to the angle of the conveyor belt 16. This resulting angle may adversely affect the unloading of cargo from the conveyor belt 16. In this situation, the extender 500 reduces the above-described resulting angle which may improve the unloading characteristics of the conveyor belt 16.

One of the many advantages of the subject embodiment of the present disclosure is that as a result of the cargo being transported along the conveyor belt 16, over the first end portion 32 of the plate 30 and inside the cargo door of the airplane, operators will not have to reach outside of the airplane. This will result in fewer injuries related to strenuous movements when reaching for cargo.

Another advantage of the subject embodiment of the present disclosure is that as a result of the cargo being transported inside the cargo door of the airplane, there is less likelihood that a piece of cargo would fall to the ground potentially damaging that piece of cargo.

A further advantage of the subject embodiment of the present disclosure is that as the airplane sways during loading due to wind, potential damage to the airplane as a result of hitting the belt loader 12 is minimized since the front end 88 of the belt loader 12 is more than 4 inches away from the airplane in the horizontal direction. As a result of the second end portion 34 of the extension assembly 14 in a preferred embodiment being positioned inside the cargo door of the airplane just beyond the sill of the cargo door, the belt loader 12 can be positioned further away from the airplane than what is required by the overnight couriers. Therefore, the airplanes are less likely to sustain damage as a result of hitting the belt loader 12.

Yet another advantage of the subject embodiment of the present disclosure is that harm to the operators is minimized since operators will not be required to reach out of the airplane for cargo that is positioned on a moving conveyor belt 16, which could catch loose articles of clothing. With the belt loader 12 positioned more than 4 inches away from the airplane and the cargo being positioned on the second end portion 34 of the extension assembly 14, operators maintain a safe distance from the moving conveyor belt 16 of the belt loader 12. For example, with the length L of the plate 30 being 16 inches in a preferred embodiment, the operators would be about 16 inches from the moving conveyor belt 16.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A belt loader assembly comprising
a belt loader having a conveyor belt and a frame; and
an extension assembly pivotally engaged with the frame of the belt loader, the extension assembly having:
a plate having a first end portion and a second end portion, each of the first and second end portions having a non-moving surface for receiving cargo, the first end portion being generally planar with the conveyor belt of the belt loader, the plate including a hinge disposed between the first and second end portions so that the second end portion of the plate can pivot relative to the first end portion;
at least one arm having a first end and a second end, the first end being in engagement with the first end portion of the plate and the second end being pivotally mounted to the frame of the belt loader; and
a guard removably engaged with the belt loader, the guard having a guard portion and a mounting portion, wherein the guard portion extends upwardly from a top surface of the frame of the belt loader and laterally between a portion of the plate and a portion of the belt loader.

2. A belt loader assembly as claimed in claim 1, wherein the plate has a bend disposed between the hinge and the second end portion of the plate.

3. A belt loader assembly as claimed in claim 2, wherein the bend defines an angle of about 15 degrees.

4. A belt loader assembly as claimed in claim 1, further comprising a bumper that is engaged to the second end portion of the plate.

5. A belt loader assembly as claimed in claim 4, wherein the bumper is manufactured from a shock-absorbing material.

6. A belt loader assembly as claimed in claim 1, wherein the second end of the arm of the extension assembly includes a pin member pivotally engaged with the frame of the belt loader.

7. A belt loader assembly as claimed in claim 6, wherein the pin member is a bushing.

8. A belt loader assembly as claimed in claim 1, wherein the plate includes a handle disposed in the second end portion of the plate.

9. A belt loader assembly as claimed in claim 8, wherein the handle is an opening through the second end portion of the extension portion.

10. An extension assembly for a belt loader comprising:
a plate having a first end portion and an oppositely disposed second end portion, the plate including a hinge disposed between the first and second end portions so that the second end portion of the plate can pivot relative to the first end portion, each of the first and second end portions having a non-moving surface for receiving cargo;
a connection portion engaged to the first end portion of the plate and adapted for engagement with a belt loader; and
a guard adapted for insertion between the connection portion and a sidewall of a belt loader, the guard extending laterally over a portion of the plate, wherein the guard is configured to extend in a generally upward direction from a top surface of a frame of the belt loader.

11. An extension assembly as claimed in claim 10, wherein the second end portion of the plate defines a plurality of handles.

12. An extension assembly as claimed in claim 11, further comprising an extender having a plurality of mounts adapted for engagement with the plurality of handles.

13. An extension assembly as claimed in claim 10, further comprising a guard having a guard portion and a mounting portion, wherein the mounting portion is selectively disposed adjacent to the connection portion.

14. A method for operating an extension assembly of a belt loader assembly, the method comprising:
- pivoting an extension assembly of a belt loader assembly about an axis of a pin member that is connectedly engaged with a belt loader such that the extension assembly is in a transport position;
- positioning a front end of the belt loader adjacent to a cargo door of a transport vehicle;
- pivoting the extension assembly about the axis of the pin member such that an end portion of a plate of the extension assembly is disposed through the cargo door of the transport vehicle; and
- inserting a mounting portion of a guard between a connection portion of the extension assembly and a side wall of the belt loader such that a guard portion extends upwardly from a top surface of a frame of the belt loader.

15. An extension assembly as claimed in claim 10, wherein the guard includes a handle.

16. An extension assembly as claimed in claim 15, wherein the handle is an elongated thru-hole.

17. An extension assembly as claimed in claim 10, wherein the guard is manufactured from a high-density polyethylene material.

18. An extension assembly as claimed in claim 10, further comprising a bumper portion disposed on the second end portion of the plate, wherein the bumper portion includes a bumper.

\* \* \* \* \*